(12) United States Patent
Lewandowski et al.

(10) Patent No.: US 12,668,257 B2
(45) Date of Patent: Jun. 30, 2026

(54) METHOD TO ADJUST ADAPTIVE CRUISE CONTROL WITH DETECTION OF AFTERMARKET TRAILER BRAKE CONTROLLER

(71) Applicant: Ford Global Technologies, LLC, Dearborn, MI (US)

(72) Inventors: Andrew Denis Lewandowski, Sterling Heights, MI (US); Brendan Diamond, Grosse Pointe, MI (US); Keith Weston, Canton, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 18/524,320

(22) Filed: Nov. 30, 2023

(65) Prior Publication Data

US 2025/0178620 A1 Jun. 5, 2025

(51) Int. Cl.
| | |
|---|---|
| *B60W 50/04* | (2006.01) |
| *B60W 40/107* | (2012.01) |
| *B60W 10/04* | (2006.01) |
| *B60W 10/196* | (2012.01) |
| *B60W 40/06* | (2012.01) |
| *B60W 40/105* | (2012.01) |
| *B60W 50/00* | (2006.01) |

(52) U.S. Cl.
CPC ........ *B60W 50/045* (2013.01); *B60W 40/107* (2013.01); *B60W 10/04* (2013.01); *B60W 10/196* (2013.01); *B60W 40/06* (2013.01); *B60W 40/105* (2013.01); *B60W 2050/0024* (2013.01); *B60W 2050/0088* (2013.01)

(58) Field of Classification Search
CPC ............ B60T 2230/06; B60T 2270/10; B60T 2201/022; B60T 17/22; B60T 2201/024; B60T 7/20; B60W 30/09; B60W 50/14; B60W 50/045; B60W 40/107; B60W 10/04; B60W 10/196; B60W 40/06; B60W 40/105; B60W 2050/0024; B60W 2050/0088
USPC ........................................................ 701/93
See application file for complete search history.

(56) References Cited

U.S. PATENT DOCUMENTS

| | | | |
|---|---|---|---|
| 8,214,124 | B2 | 7/2012 | Kumabe et al. |
| 8,788,176 | B1 | 7/2014 | Yopp |
| 9,180,890 | B2 | 11/2015 | Lu et al. |
| 9,428,190 | B2 | 8/2016 | Weston |
| 9,592,800 | B2 | 3/2017 | Matoy et al. |
| 10,065,641 | B2 | 9/2018 | Fraser et al. |
| 10,207,687 | B1 | 2/2019 | Shimizu et al. |
| 10,549,732 | B2 | 2/2020 | Kasper et al. |

(Continued)

*Primary Examiner* — Hitesh Patel
(74) *Attorney, Agent, or Firm* — Lorne Forsythe; Price Heneveld LLP

(57) ABSTRACT

A motor vehicle includes an adaptive cruise control ("ACC") that is configured to generate requests to actuate a speed reduction system of the vehicle and/or an active speed reduction system of a trailer. The actuation requests are based, at least in part, on sensor data from one or more sensors. The ACC may be configured to determine effects of an active speed reduction system of a trailer, and the ACC may adjust the speed reduction requests to the vehicle and/or the trailer based, at least in part, on measured effects of the speed reduction system of the trailer.

20 Claims, 8 Drawing Sheets

(56) References Cited

U.S. PATENT DOCUMENTS

| | | | |
|---|---|---|---|
| 10,703,345 B2 | 7/2020 | Niedert et al. | |
| 10,821,947 B2 | 11/2020 | Wijffels et al. | |
| 2003/0158648 A1 | 8/2003 | Kubota et al. | |
| 2010/0204897 A1* | 8/2010 | Labuhn | B60W 30/16 |
| | | | 701/93 |
| 2011/0191000 A1* | 8/2011 | Grolle | B60W 10/06 |
| | | | 701/96 |
| 2012/0119894 A1 | 5/2012 | Pandy | |
| 2012/0197507 A1* | 8/2012 | Custer | B60W 30/16 |
| | | | 701/96 |
| 2013/0138288 A1 | 5/2013 | Nickolaou et al. | |
| 2014/0100754 A1 | 4/2014 | Schwindt | |
| 2014/0163798 A1* | 6/2014 | Ross | B60W 30/00 |
| | | | 903/930 |
| 2015/0353063 A1 | 12/2015 | Tuhro et al. | |
| 2016/0176403 A1 | 6/2016 | Weston | |
| 2016/0251005 A1 | 9/2016 | Morselli et al. | |
| 2018/0215358 A1* | 8/2018 | Hall | B60T 8/3205 |
| 2018/0339685 A1 | 11/2018 | Hill et al. | |
| 2019/0366989 A1 | 12/2019 | James et al. | |
| 2020/0062233 A1 | 2/2020 | Yu | |
| 2020/0080968 A1 | 3/2020 | Lowry et al. | |
| 2021/0139008 A1 | 5/2021 | DiGioacchino et al. | |
| 2022/0080968 A1 | 3/2022 | Zhu et al. | |
| 2022/0324448 A1 | 10/2022 | Lewandowski et al. | |
| 2022/0355772 A1 | 11/2022 | Matschke et al. | |
| 2022/0371588 A1 | 11/2022 | Weston et al. | |
| 2023/0110101 A1 | 4/2023 | Lewandowski et al. | |
| 2023/0150496 A1 | 5/2023 | Barrett et al. | |
| 2023/0159029 A1 | 5/2023 | Tseng et al. | |
| 2024/0140153 A1* | 5/2024 | Hall | B60D 1/62 |
| 2024/0199013 A1* | 6/2024 | Llewellyn | B60W 10/10 |
| 2025/0145149 A1* | 5/2025 | Wulf | B60W 50/14 |
| 2025/0178620 A1* | 6/2025 | Lewandowski | B60W 40/107 |
| 2025/0209824 A1* | 6/2025 | Ropel | G06V 20/58 |
| 2025/0242784 A1* | 7/2025 | Diamond | B60T 8/1708 |

* cited by examiner

70

START

MONITOR CONDITIONS OF ROADWAY
WHILE ACC FEATURE ACTIVE                    72

IDENTIFY EXPECTED CONDITION
CHANGE                                       74

DETERMINE PREFERRED POWER
STATE FOR ENGINE BASED ON
EXPECTED CONDITION CHANGE                    76

DETERMINE THAT ENGINE POWER
STATE TRANSITION PLANNED FOR
ENGINE                                       78

RESOLVE ENGINE POWER STATE
TRANSITION BASED ON PREFERRED
POWER STATE                                  80

END

Storage Medium 100

Computer-Executable Instructions for 70

Computer-Executable Instructions for 90

FIG. 6

METHOD TO ADJUST ADAPTIVE CRUISE CONTROL WITH DETECTION OF AFTERMARKET TRAILER BRAKE CONTROLLER

BACKGROUND OF THE DISCLOSURE

Adaptive cruise control is a vehicle feature that, when engaged, controls vehicle propulsion power in order to maintain a set speed when possible, while monitoring the road in front of the vehicle in order to detect other vehicles that may be present. When the adaptive cruise control feature detects the presence of a slower-moving vehicle in front of the controlled vehicle, it can reduce the speed of the controlled vehicle below the set speed in order to maintain a specified minimum following distance. Subsequently, if the adaptive cruise control feature detects that the road in front of the vehicle has become clear, it can cause the vehicle to increase speed back up to the set speed.

SUMMARY OF THE DISCLOSURE

An aspect of the present disclosure is a motor vehicle including a vehicle control system and a speed control system that is configured to control a speed of the vehicle (e.g., maintain, increase, or reduce vehicle speed). The speed control system may include a negative torque system (e.g., one or more devices) that are configured to generate negative wheel torque tending to reduce or limit a speed of the vehicle. In general, as used herein, a negative wheel torque or negative torque refers to a wheel torque that tends to reduce vehicle speed, and a positive wheel torque refers to wheel torque (e.g., from a motor) that tends to increase vehicle speed. The speed control system may be configured to limit and/or reduce a speed of the vehicle using an engine of the speed control system and/or the negative torque system when the speed control system receives a negative wheel torque (speed reduction) command from the vehicle control system. The vehicle control system includes an adaptive cruise control (ACC) that is configured to operate the speed control system to provide a target vehicle rate of reduction in speed when the vehicle is towing a trailer having active negative torque (speed reduction) system (e.g., friction devices that provide a negative wheel torque to wheels of a trailer tending to reduce a speed of the trailer). The adaptive cruise control may be configured to generate speed reduction (negative torque) commands to the speed control system and/or commands to active the negative torque system of a trailer to maintain a vehicle speed and/or a target following distance between the vehicle and a target vehicle in front of the vehicle, wherein the negative wheel torque commands are associated with expected rates of reductions in speed of the vehicle. The adaptive cruise control may be configured to determine an estimated combined mass of the vehicle and trailer. The adaptive cruise control is also configured to determine the rate of reduction in speed of the vehicle due to the active negative torque system of the trailer based, at least in part, on the estimated combined mass of the vehicle and trailer, and measured rate of reduction in speed of the vehicle in response to a negative torque command. The adaptive cruise control is configured to compare the measured rate of reduction in speed of the vehicle to an expected rate of reduction in speed of the vehicle corresponding to the negative torque command, and to adjust negative torque commands to the vehicle speed control system and/or negative torque commands to the active negative torque system of the trailer to provide vehicle rate of reduction in speed that satisfies predefined criteria.

Embodiments of the first aspect of the present disclosure can include any one or a combination of the following features:

The predefined criteria may optionally comprise a maximum rate of change of rate of reduction in speed.

The rate of change of rate of reduction in speed may optionally comprise a predefined numerical value.

The adaptive cruise control may be configured to utilize a towing mode if the adaptive cruise control determines that a trailer is connected to the vehicle.

When in the towing mode the adaptive cruise control may be configured to determine a desired rate of reduction in speed and generate an initial negative wheel torque command to the speed control system based, at least in part, on the desired rate of reduction in speed. The adaptive cruise control may be configured to determine a difference between a measured rate of reduction in speed resulting from the negative wheel torque command and the desired rate of reduction in speed and to adjust the initial negative wheel torque command to provide an adjusted negative wheel torque command that reduces differences between measured rate of reduction in speed and desired rate of reduction in speed.

The adaptive cruise control may be configured to store an adjusted negative wheel torque command and associate the adjusted negative wheel torque command with a specific trailer configuration.

The adaptive cruise control may be configured to determine a plurality of adjusted negative wheel torque commands, wherein each adjusted negative wheel torque command is associated with a specific trailer configuration and vehicle operating condition.

The vehicle operating conditions may include vehicle speed.

The adaptive cruise control may be configured to repeatedly determine a difference between a measured rate of reduction in speed resulting from the negative wheel torque command and the desired rate of reduction in speed, and to adjust the initial negative wheel torque command to provide an adjusted negative wheel torque command that further reduces differences between measured rate of reduction in speed and desired rate of reduction in speed.

The controller (cruise control) may be configured to reduce a gain of a negative wheel torque command to the speed control system and/or a negative wheel torque command to the active negative wheel torque system of a trailer if the measured rate of reduction in speed associated with a negative wheel torque command is greater than the expected rate of reduction in speed associated with the negative wheel torque command.

The controller (cruise control) may be configured to associate a plurality of reduced gains with specific vehicle operating parameters and utilize a selected one of the reduced gains when the specific vehicle operating parameters are present.

The specific vehicle operating parameters may include vehicle speed.

Another aspect of the present disclosure is a method of controlling a motor vehicle while the motor vehicle is towing a trailer having an active negative torque (speed reduction) system. The method includes actuating cruise control of the vehicle to control a speed control system of the vehicle. The method further includes utilizing the vehicle cruise control to provide sped reduction (negative wheel torque) commands to at least one of active negative wheel torque system of a trailer being towed by the vehicle and a vehicle speed control system, wherein the negative wheel torque command is provided while the vehicle is towing a trailer having an active negative wheel torque system, and wherein the negative wheel torque command corresponds to an expected rate of reduction in speed. The method further includes measuring rate of reduction in speed of the vehicle in response to the negative wheel torque commands, and determining a difference between a measured rate of reduction in speed and the expected rate of reduction in speed corresponding to the negative wheel torque command or commands. The method further includes utilizing the vehicle cruise control to provide an adjusted negative wheel torque command that reduces the difference between measured rate of reduction in speed and the expected rate of reduction in speed.

The method may include utilizing a control system of the vehicle to determine a rate of reduction in speed due to the active negative wheel torque system of a trailer that is being towed by the vehicle.

The method may include utilizing the control system of the vehicle to adjust the negative wheel torque command to the vehicle speed control system and/or the active negative wheel torque system of a trailer that is being towed by the vehicle.

The method may include storing an adjusted negative wheel torque command and an associated vehicle operating condition.

The method may include causing the vehicle cruise control to utilize the adjusted negative wheel torque command when the vehicle cruise control determines that the associated vehicle operating condition is present.

The associated vehicle operating condition may comprise vehicle speed, and the method may include storing a plurality of adjusted negative wheel torque commands, wherein the adjusted negative wheel torque commands are associated with different vehicle speeds.

The method may further include providing a trailer input gain control feature that permits a user to adjust a gain of negative wheel torque (speed reduction) signals to negative wheel torque system of the trailer to thereby adjust (increase or decrease) negative wheel torque requests from the cruise control, wherein each rate of negative wheel torque request corresponds to a negative wheel torque of the vehicle speed control system that is used to maintain the vehicle at a first speed. The gain of a negative wheel torque signal to negative wheel torque devices of the trailer may be adjusted until an acceptable gain is found at which the vehicle cruise control provides combined vehicle and trailer rate of reduction in speed that is acceptable to the user. The method may also include determining a target ratio corresponding to the acceptable gain, wherein the target ratio comprises a ratio of negative vehicle wheel torque at the first speed to a requested rate of reduction in speed at the first speed. When the vehicle is not operating at the first speed, the method may include determining a present ratio of the vehicle speed to requested rate of reduction in speed (due to negative wheel torque), and adjusting the gain of a negative wheel torque signal to the negative wheel torque system of the trailer to reduce a difference between the target ratio and the present ratio.

Another aspect of the present disclosure is a motor vehicle including one or more sensors that are configured to provide sensor data concerning vehicle operating parameters. The motor vehicle further includes a speed control system having a motor that is configured to provide a positive torque to increase or maintain a speed of the vehicle, and vehicle negative wheel torque (speed reduction) system that provides a negative torque that tends to reduce a speed of the vehicle. The vehicle further includes an adaptive cruise control (ACC) that is configured to generate negative wheel torque actuation requests to actuate the vehicle negative wheel torque system and/or an active negative wheel torque system of a trailer. The actuation requests are based, at least in part, on sensor data from the one or more sensors. The adaptive cruise control may be configured to determine rate of reduction in speed effects of the active negative wheel torque system of a trailer, and to adjust the actuation requests to the vehicle negative wheel torque system and/or the active trailer negative wheel torque system based, at least in part, on the rate of reduction in speed effects of the active negative wheel torque system of a trailer being towed by the vehicle to thereby reduce variations in the rate of reduction in speed caused by the active trailer negative wheel torque system.

The motor vehicle may be configured to determine if a trailer is operably connected to the motor vehicle.

The adaptive cruise control may be configured to generate actuation requests corresponding to desired rate of reduction in speed.

The adaptive cruise control may be configured to compare measured rates of reductions in speed resulting from actuation requests, and adjust new actuation requests to reduce differences between the measured rates of reductions in speed and the desired rate of reduction in speed.

A trailer may be operably connected to the motor vehicle, and the trailer may include an active negative wheel torque system.

The adaptive cruise control may be configured such that, prior to adjustment of the actuation request, the adaptive cruise control may cause at least some speed reduction overshoot and/or at least some speed reduction undershoot, wherein the speed reduction overshoot comprises a rate of reduction in speed that is greater than a desired rate of reduction in speed, and the undershoot comprises a rate of reduction in speed that is less than a desired rate of reduction in speed. The adjustments of the actuation requests may reduce overshoot and/or undershoot. If the speed reduction overshoot and/or undershoot exceed a threshold value, the vehicle may provide a communication to a user indicating that the user should take over speed reduction to manually control speed reduction.

The adaptive cruise control may be configured to provide a first gain of a negative wheel torque signal to the negative wheel torque system of the trailer at highway speeds, and a second gain of a negative wheel torque signal to the negative wheel torque system of the trailer at low speeds, wherein the first trailer gain is greater than the second trailer gain, and wherein the highway speeds comprise a range of speeds from 55 mph-75 mph, and the low speeds comprise a range of speeds from 5 mph-35 mph.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 6 is a schematic of an example storage medium according to an aspect of the present disclosure;

DETAILED DESCRIPTION OF PREFERRED EMBODIMENTS

Figure 1:
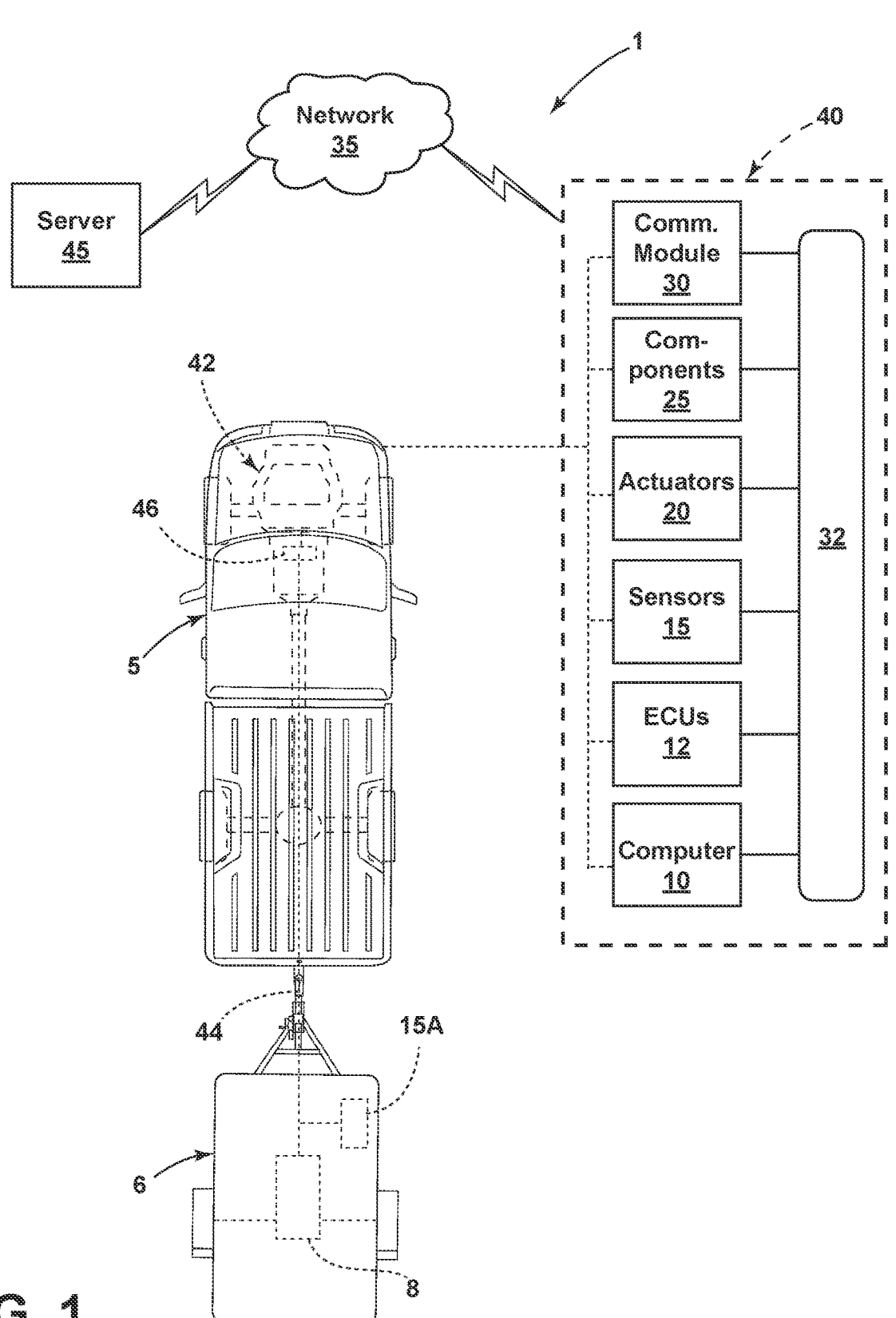
FIG. 1 is a schematic of a vehicle system according to an aspect of the present disclosure.
Figure 2:
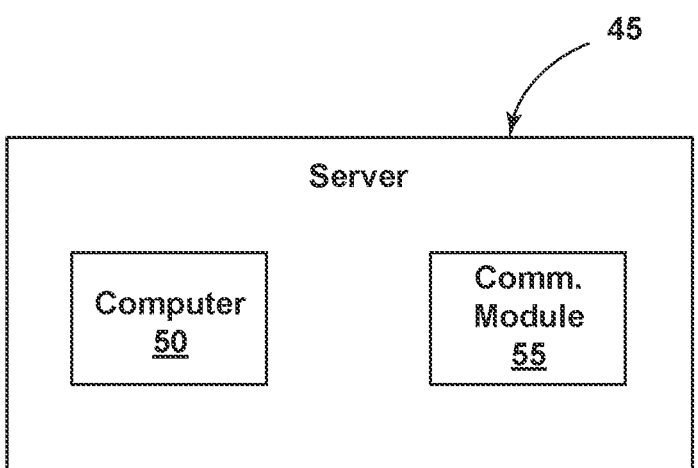
FIG. 2 is a schematic of an example server computer according to an aspect of the present disclosure.

The present application is related to U.S. Pat. No. 9,428, 190, which issued on Aug. 30, 2016 and entitled "ADAPTIVE CRUISE CONROL WHILE TOWING," which is incorporated herein by reference in its entirety.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIGS. 1-6 show an example of an adaptive cruise control ("ACC"). As discussed in more detail below in connection with FIGS. 7-9, the ACC may incorporate detection of aftermarket trailer negative wheel torque (speed reduction) systems, and the ACC may also provide for adjustment of commands when a trailer is detected. However, it will be understood that aftermarket trailer negative wheel torque (speed reduction) systems control and adjustment according to the present disclosure may be utilized in connection with a wide variety of ACC, and the present disclosure is not limited to the ACC of FIGS. 1-6.

FIG. 1 is a block diagram of an example vehicle system 1. The system 1 includes a vehicle 5 and a trailer 6. The vehicle 5 includes a computer 10, electronic control units (ECUs) 12, vehicle sensors 15, actuators 20 to actuate various vehicle components 25, a communications module 30, and a vehicle network 32. Communications module 30 allows vehicle 5 to communicate with a server 45 via a network 35. Vehicle 5 may be configured to tow a trailer 6 which may have an active negative wheel torque system 8.

Trailer 6 may be operably connected to controller 40 by a conductive line 44. If trailer 6 has a known configuration with active negative wheel torque (brake) system 8 that is known, controller 40 may be pre-configured (e.g., "from the factory") to provide modified requests to speed control system 42 and/or to active negative wheel torque system 8 that take into account the additional weight of trailer 6 and the rates of reductions in speed effects of active negative wheel torque system 8 to thereby provide a desired rate of reduction in speed when towing trailer 6. Alternatively, as discussed below in connection with FIGS. 7-9, trailer 6 may comprise an "aftermarket" trailer having active negative wheel torque system 8 that is not recognized by controller 40, in which case controller 40 determines the weight of trailer 6 and/or the rates of reductions in speed effects of active negative wheel torque system 8, and controller 40 may adjust the negative wheel torque (speed reduction) requests to provide a desired rate of reduction in speed.

The components 10, 12, 15, 20, 25, and 30 may form a controller 40 that is operably connected to a vehicle speed control system 42. Controller 40 may be configured to provide adaptive cruise control ("ACC") by providing vehicle speed control system 42 with commands or requests to increase and/or decrease vehicle speed (e.g., negative wheel torque requests). Speed control system 42 may include an engine (electric and/or internal combustion) and a negative wheel torque (speed reduction) system. As discussed in more detail below, controller 40 may be configured to generate negative wheel torque requests/commands to the speed control system 42. Speed control system 42 may utilize engine drag and/or the negative torque system to provide the desired (requested) rate of reduction in speed. The negative wheel torque system may comprise, for example, friction devices (brakes) and/or electrical devices that can be actuated to provide negative wheel torque tending to reduce vehicle speed.

The control system (computer 10) may include a processor and a memory. Computer 10 may optionally include multiple processors that are operably interconnected, each one of which may be configured in a suitable manner as required for a particular application. The computer 10 may operate vehicle 5 in an autonomous, a semi-autonomous mode, or a non-autonomous (manual) mode. For purposes of this disclosure, an autonomous mode is one in which each of vehicle propulsion, negative wheel torque (speed reduction), and steering are controlled by the computer 10; in a semi-autonomous mode the computer 10 controls one or two of vehicle propulsion, negative wheel torque (speed reduction), and steering; in a non-autonomous mode a human operator controls each of vehicle propulsion, negative wheel torque (speed reduction), and steering. The computer 10 may include programming to operate one or more vehicle negative wheel torque system and/or propulsion.

The computer 10 may be communicatively coupled to, e.g., via vehicle network 32 as described further below, to one or more processors located in other device(s) included in the vehicle 5. Further, the computer 10 may communicate, via communications module 30, with a navigation system that uses the Global Position System (GPS). As an example, the computer 10 may request and receive location data of the vehicle 5.

ECUs 12 (which can also be referred to as electronic control modules (ECMs) or simply as "control modules") may comprise one or more computing devices that monitor and/or control various vehicle components 25 of vehicle 5. Examples of ECUs 12 may include an engine control module, a transmission control module, a speed control system module, a control module that controls the negative wheel torque (speed reduction) system, a steering control module, etc. The processor of a given ECU 12 may be implemented using virtually any suitable device.

Vehicle network 32 may comprise a network via which messages can be exchanged between various devices in vehicle 5. Computer 10 can be generally programmed to send and/or receive, via vehicle network 32, messages to and/or from other devices in vehicle 5 (e.g., any or all of ECUs 12, sensors 15, actuators 20, components 25, communications module 30, a human machine interface (HMI), etc.). Further, as mentioned below, various controllers and/or vehicle sensors 15 may provide data to the computer 10. Vehicle network 32 may optionally comprise a combination of multiple networks, possibly of different types, that support communications among devices in vehicle 5.

Vehicle sensors 15 may include a variety of devices such as are known to provide data to the computer 10. For example, the vehicle sensors 15 may include Light Detection and Ranging (lidar) sensor(s) 15, etc., disposed on a top of the vehicle 5, behind a vehicle 5 front windshield, around the vehicle 5, etc., that provide relative locations, sizes, and shapes of objects and/or conditions surrounding the vehicle 5. As another example, one or more radar sensors 15 fixed to vehicle 5 bumpers may provide range and velocity data of objects (possibly including second vehicles, trailer 6), etc., relative to the location of the vehicle 5. The vehicle sensors 15 may further include camera sensor(s) 15, e.g., front view, side view, rear view, etc., providing images from a field of view inside and/or outside the vehicle 5.

Actuators 20 may be implemented via circuitry, chips, motors, or other suitable electronic and or mechanical components that can actuate various vehicle subsystems in accordance with appropriate control signals as is known. The actuators 20 may be used to control components 25, including speed reduction and/or speed increase, and/or steering of a vehicle 5.

In the context of the present disclosure, a vehicle component 25 may comprise one or more hardware components adapted to perform a mechanical or electro-mechanical function or operation such as moving the vehicle 5, slowing or stopping the vehicle 5, steering the vehicle 5, etc. Non-limiting examples of components 25 include a propulsion component of speed control system 42 (that includes, e.g., an internal combustion engine and/or an electric motor, etc.), a transmission component, a steering component (e.g., that may include one or more of a steering wheel, a steering rack, etc.), a negative wheel torque system, a component that can be utilized by a user to select a gain of a negative wheel torque signal to negative wheel torque system 8 of trailer 6, a park assist component, an adaptive cruise control component, an adaptive steering component, etc.

In addition, the computer 10 may be configured for communicating via communication module 30 with devices outside of the vehicle 105, e.g., through vehicle-to-vehicle (V2V) or vehicle-to-infrastructure (V2I) wireless communications to another vehicle, to (typically via the network 35) a remote server 45 (V2V and V2I may be collectively referred to herein as V2X). The network 35 may comprise virtually any suitable arrangement, such as one or more of various wired or wireless communication mechanisms, including any desired combination of wired (e.g., cable and fiber) and/or wireless (e.g., cellular, wireless, satellite, microwave, and radio frequency) communication mechanisms and any desired network topology.

Computer 10 may be configured to receive and analyze data from sensors 15 substantially continuously, periodically, and/or when instructed by a server 45, etc. Further, object classification or identification techniques can be used, e.g., in a computer 10 based on lidar sensor 15, camera sensor 15, etc., data, to identify a type of object, e.g., trailer (FIG. 2) vehicle, person, rock, pothole, bicycle, motorcycle, etc., as well as physical features of objects. Server 45 (FIG. 2) may include a computer 50 and a communications module 55. The computer 50 may include a processor and a memory. The communications module 55 may include conventional mechanisms for wired and/or wireless communications that allow computer 50 to communicate with other devices, such as the vehicle 5, via wireless and or wired communication networks/links, etc.

Figure 3:
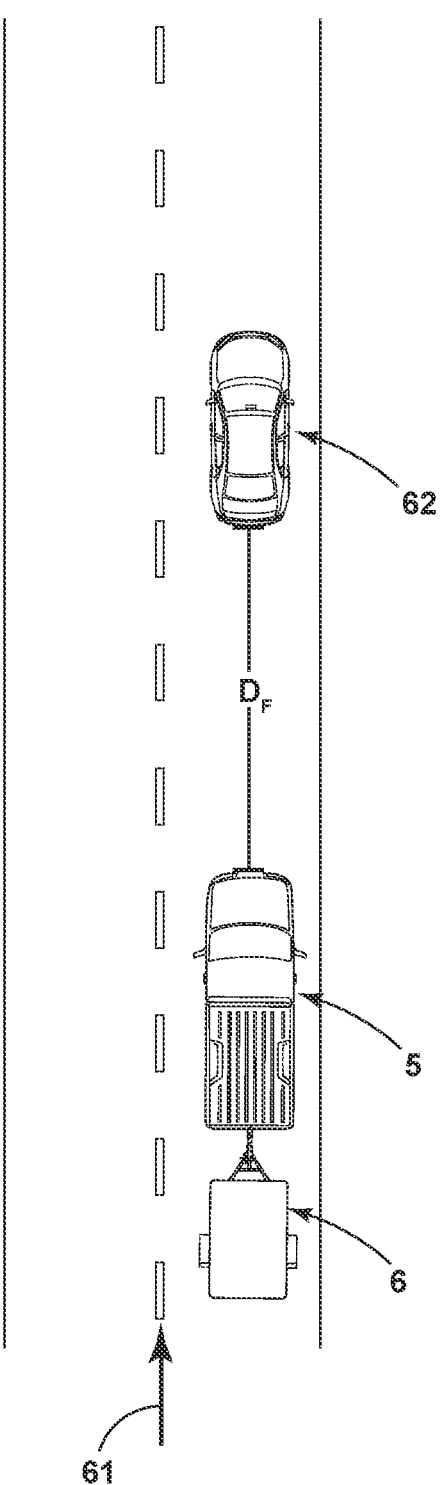
FIG. 3 is a schematic of an example traffic scene according to an aspect of the present disclosure.

FIG. 3 is a schematic diagram of an example traffic scene 60. In traffic scene 60, while ACC of vehicle 5 is engaged, vehicle 5 travels a roadway 61, optionally towing a trailer 6. While engaged, the ACC of vehicle 5 can control vehicle propulsion power and/or negative wheel torque devices in order to maintain a set speed when possible, while monitoring the road in front of vehicle 5 in order to detect other vehicles that may be present. The ACC may be configured to monitor the road in front of vehicle 5 for the presence of other vehicle(s) based on sensor data provided by one or more sensors (e.g., one or more sensors 15).

When the ACC detects the presence of a vehicle 62 in front of vehicle 5, it can, according to calculations that will be understood, determine whether vehicle 5, if it continues to travel at the set speed, will approach to within a specified minimum following distance from the detected vehicle. If so, the ACC may be configured to temporarily reduce the speed of vehicle 5 below the set speed (e.g., by actuating negative wheel torque systems of vehicle 5 and/or trailer 6). In this context, the slower the speed of the leading vehicle 62 in front of vehicle 5, the greater will be the extent to which the ACC reduces the speed of vehicle 5. If the leading vehicle 62 slows to a stop, ACC may cause vehicle 5 to also slow to a stop before it approaches closer than the specified distance.

In general, the specified distance may be adjusted (e.g., increased) by the ACC if vehicle 5 detects a trailer 6 having an active negative wheel torque system 8. Also, the commands of the ACC to change speed may be adjusted if vehicle 5 detects a trailer 6. For example, the ACC may (optionally) request a reduced rate of reduction in speed (reduced negative wheel torque) when towing a trailer 6.

In the traffic scene of FIG. 3, vehicle 5 travels roadway 61 with the ACC engaged, and follows a vehicle 62. The ACC controls engine power at vehicle 5 in order to maintain, between vehicle 5 and vehicle 62, a specified distance. This specified distance may be a distance DF(s) that varies as a function of the speed of vehicle 5 (e.g., increases as the speed of vehicle 5 increases), and/or could be specified by user input, for example. Upon reaching traffic congestion, vehicle 62 may slow to a stop, and, in turn, the ACC of vehicle 5 may cause vehicle 5 to slow to a stop (e.g., preserving a distance DF (0) between the front of vehicle 5 and the back of vehicle 62). Vehicle 5 may optionally include an electrical energy source (such as a battery) and an electric motor and/or an internal combustion engine that also can generate propulsion for vehicle 5.

Factors affecting the power demands associated with propulsion of vehicle 5 can include road grade and other road conditions. Factors affecting the power demands of vehicle 5 can also include vehicle weight, tire type, payload, towing of a trailer 6, and aerodynamic resistance. Demands for propulsion power can also be affected by maneuvers of vehicle 5 as it travels roadway 61, such as lane changes. The propulsion (and associated power demands) commanded by the ACC can vary as the ACC changes the speed of vehicle 5 to adapt its speed as it travels roadway 61. Vehicle 5 may optionally identify a change in speed limit. For instance, vehicle 5 can determine that the speed limit of roadway 61 drops by 10 mph at an upcoming point along roadway 61. In some implementations, vehicle 5 can identify an expected condition change corresponding to a change in speed limit based on electronic horizon data. Electronic horizon data may comprise data as obtained via vehicle sensors and/or stored map data indicating a current position or location of the vehicle 5 and predicting a future trajectory of the vehicle 5 with respect to an upcoming portion of roadway 61.

In some implementations, having identified an expected condition change, vehicle 5 can determine a preferred power state for the engine based on that expected condition change. The preferred power state can be a power state that is appropriate for the power demands expected to be observed assuming that the expected condition change does in fact occur.

In some implementations, vehicle 5 may be configured to take information regarding road grade/inclination into account in conjunction with controlling engine power state transitions. Vehicle 5 can optionally obtain information regarding road grade/inclination from electronic horizon data provided by one or more data providers/services. In some implementations, as it travels a given roadway (e.g., roadway 61), vehicle 5 may be configured to determine whether the road grade will change at upcoming points along the roadway, and if so, can take such change(s) into account.

Figure 4:
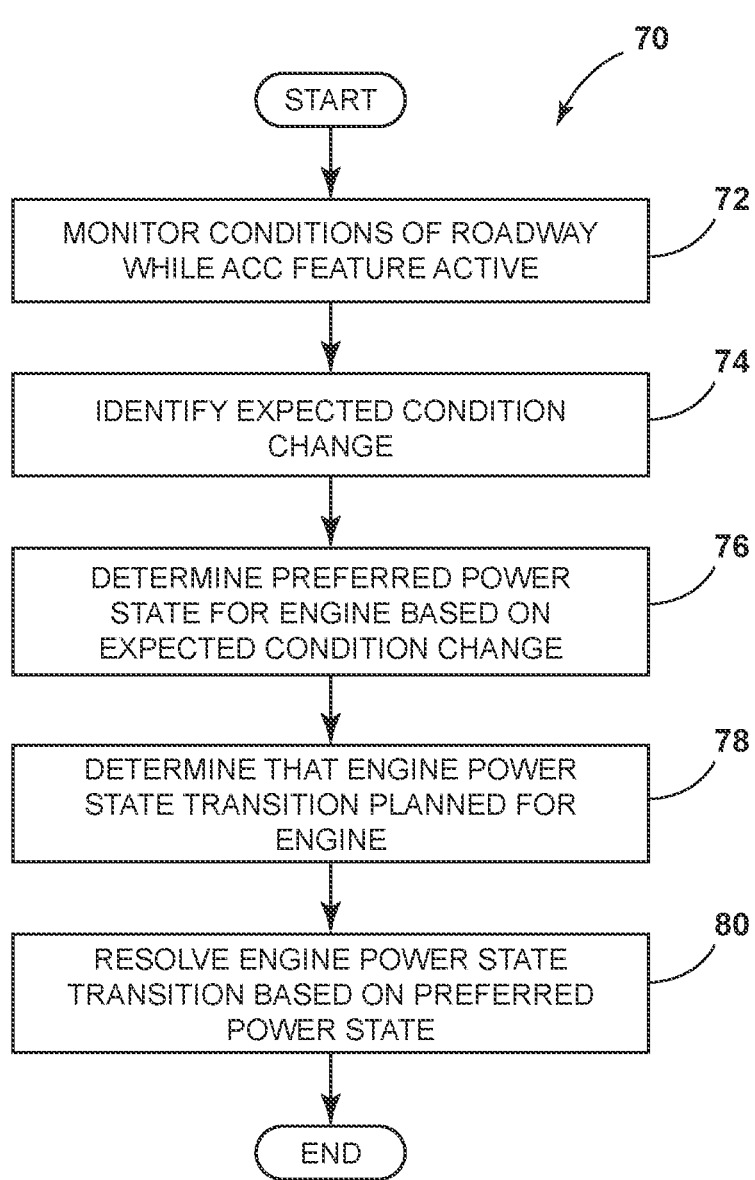
FIG. 4 is a schematic of a process flow according to an aspect of the present disclosure.

FIG. 4 is a block diagram of a process flow 70, which may be representative of operations executed in various implementations. As shown in process flow 70, conditions of a roadway can be monitored at 72 as a vehicle travels the roadway while the ACC of vehicle 5 is active. At 74, an expected condition change can be identified based on the monitoring at 72. At 76, a preferred power state for an engine of the vehicle can be determined based on the expected condition change identified at 74. At 78, it can be determined that an engine power state transition is planned for the engine. At 80, the planned engine power state transition can be resolved based on the preferred power state determined at 76. It will be understood that process flow 70 of FIG. 4 may incorporate the process 100 of FIG. 7, which process is described in more detail below.

Figure 5:
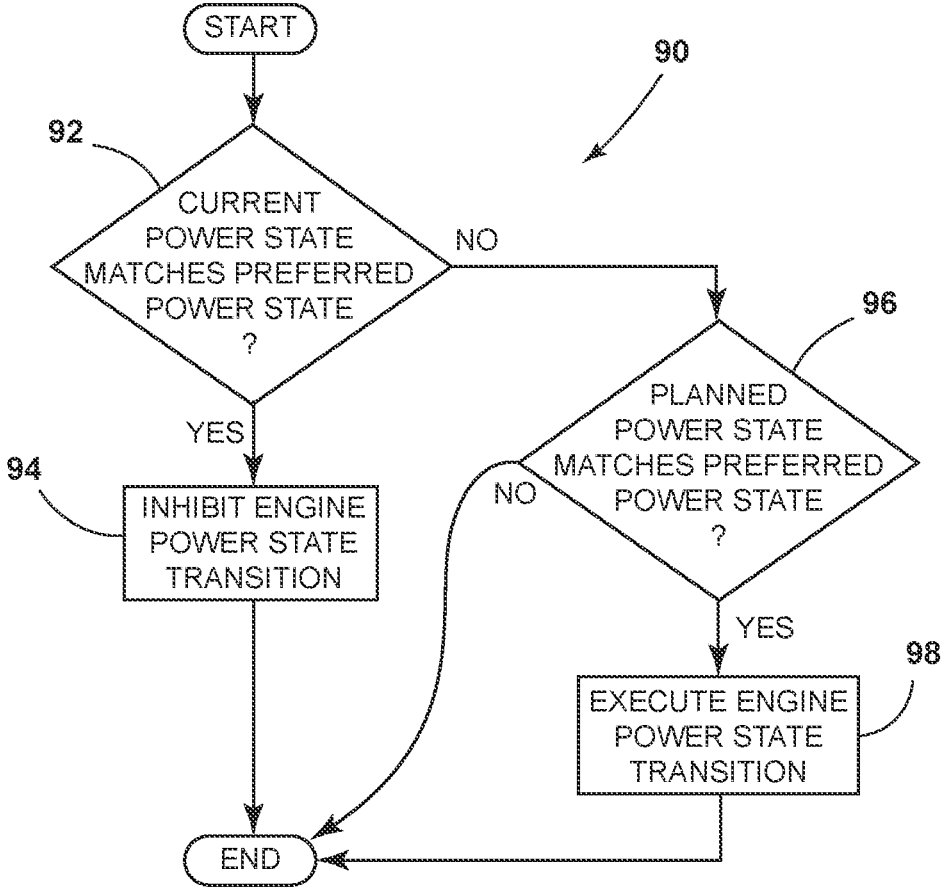
FIG. 5 is a schematic of a process flow according to an aspect of the present disclosure.
Figure 7:
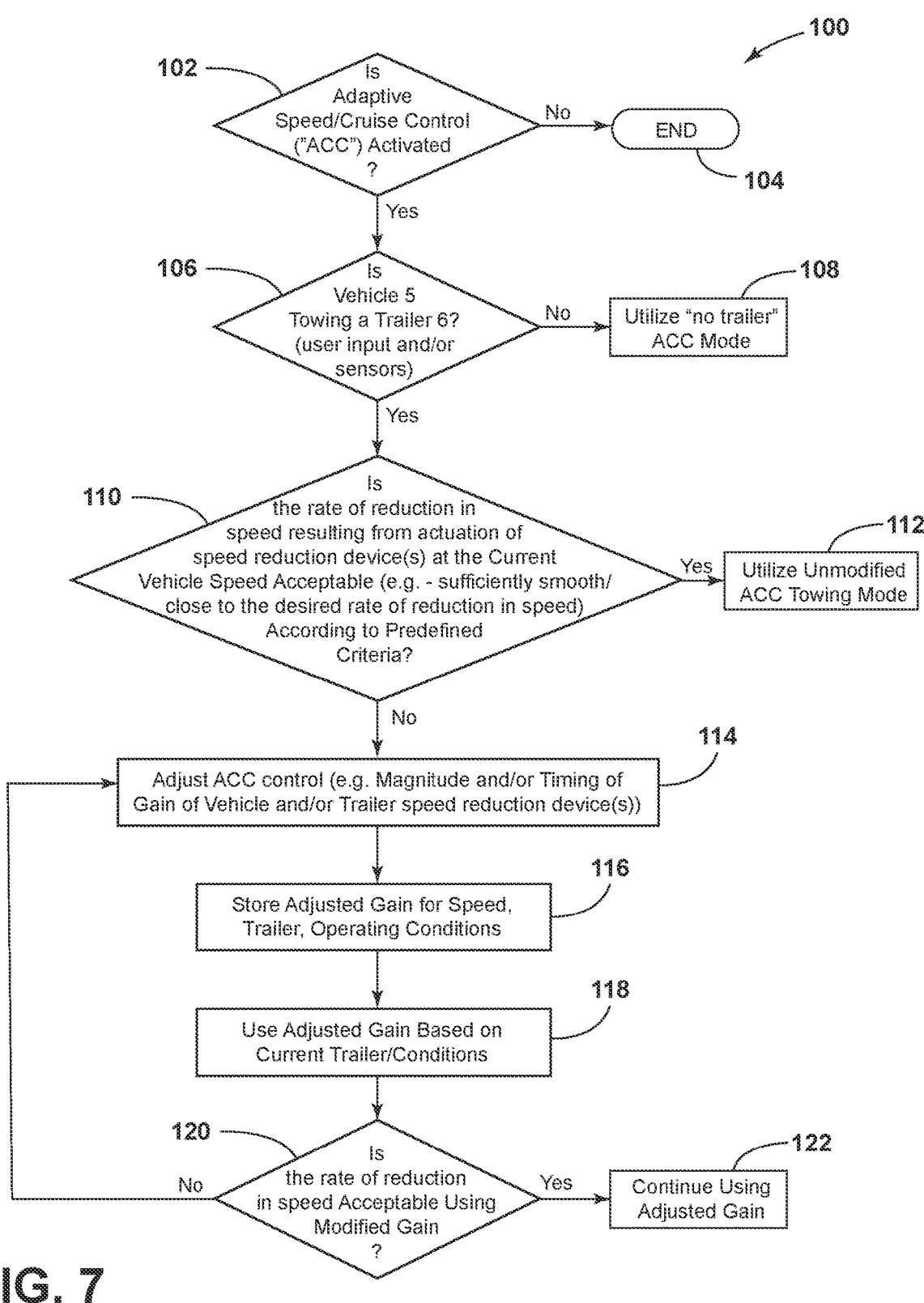
FIG. 7 is a flow chart showing adjustment of adaptive cruise control when a vehicle is towing a trailer with one or more active negative wheel torque systems.

FIG. 5 is a block diagram of a process flow 90, which may be representative of operations executed in various implementations. In some implementations, process flow 90 can be used to resolve the planned engine power state transition at 80 in process flow 70 of FIG. 4. As shown in process flow 90, a determination can be made at 92 of whether the current power state matches the preferred power state. If it is determined at 92 that the current power state matches the preferred power state, the engine power state transition can then be inhibited at 94, after which the process flow can end. If it is determined at 502 that the current power state does not match the preferred power state, a determination can be made at 96 of whether the planned power state matches the preferred power state. If it is determined at 96 that the planned power state does not match the preferred power state, the process flow can end. If it is determined at 96 that the planned power state matches the preferred power state, the engine power state transition can then be executed at 98, after which the process flow can end. Process 90 may incorporate the process 100 of (FIG. 7).

Figure 6:
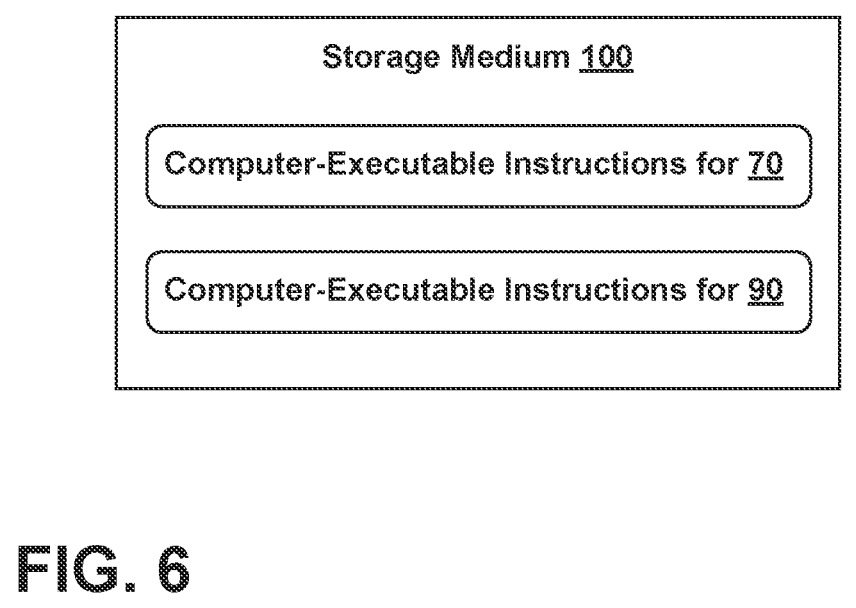

Processes 70 (FIG. 4) and 90 (FIG. 5) may optionally be implemented via storage medium 100 (FIG. 6). Storage medium 100 may optionally comprise any suitable medium such as non-transitory computer-readable storage medium or machine-readable storage medium, such as an optical, magnetic or semiconductor storage medium.

As discussed above in connection with FIG. 1, the adaptive cruise control ("ACC") of vehicle 1 may be implemented utilizing controller 40, and the ACC may be configured to maintain the ACC operation while the vehicle 5 is towing a trailer 6. Trailer 6 may comprise a known trailer having a known weight, rolling resistance, and other parameters, and trailer 6 may also have an active (e.g., powered) negative wheel torque system 8 having known effects with regards to reducing speed. When trailer 6 is operably connected to vehicle 5, a communication line 44 or other wireless interconnect may be utilized to operably interconnect the controller 40 with the negative wheel torque system 8 of trailer 6. The active negative wheel torque system 8 of trailer 6 may comprise, for example, friction and/or electrical devices that create negative wheel torque tending to slow trailer 6. If controller 40 recognizes the configuration of the trailer 6, the controller 40 may implement modified ACC commands to account for the effects of trailer 6 and active negative wheel torque system 8. Thus, controller 40 may be pre-configured to provide a desired ACC behavior when a trailer 6 having a known configuration is being towed.

However, if trailer 6 has active negative wheel torque system 8 (e.g., an "aftermarket" active system that provides negative torque to the wheels of trailer 6 tending to reduce a speed of trailer 6), controller 40 may not initially recognize the trailer 6 and active negative torque system 8. In this case, controller 40 may, at least initially, provide ACC requests to speed control system 42 that do not result in the desired rate of reduction in speed. For example, an initial (measured) rate of reduction in speed (jerk) request to the vehicle speed control system 42 and/or the active negative wheel torque system 8 of trailer 6 may result in changes in the rate of reduction in speed (jerk) that are outside of an acceptable predefined range. Thus, controller 40 may be configured to determine the effects of trailer 6 and active negative torque system 8 of trailer 6 to reduce the variations in the rate of reduction in speed (i.e. reduce or eliminate jerk), It will be understood that "jerk" as used herein generally refers to the third derivative of position with respect to time, and reduction in speed generally refers to the second derivative of position with respect to time, and speed generally refers to the first derivative of position with respect to time.

With further reference to FIG. 7, the ACC system/process (e.g., controller 40) may be utilized to implement a process 100 to determine if a trailer 6 with aftermarket active negative wheel torque system 8 is operably connected to the vehicle 5. If a trailer 6 with aftermarket active negative wheel torque device(s) is detected, process 100 compensates for the effects of trailer 6 and the active negative wheel torque system 8 during operation of the ACC of the vehicle 5. At step 102, the system determines if the ACC is activated. If not, process 100 ends at 104. However, if the ACC is activated, at step 106 the ACC system determines if the vehicle 5 is towing a trailer 6. Vehicle 5 may include a user input 46 (FIG. 1) such as a touch screen display inside vehicle 5 whereby a user can notify the system that a trailer 6 is being towed. Alternatively, the ACC may sense that the vehicle 5 does not change speed (increase and/or decrease) in an expected manner, and thereby determine that the vehicle 5 is towing a trailer 6. In general, vehicle 5 may be configured to sense/detect a trailer 6 (and negative wheel torque system 8) when the ACC is not activated, or when the ACC is activated as shown in FIG. 7. The ACC may be configured such that negative wheel torque (speed change) requests (increases and/or decreases in speed) are configured to provide expected vehicle rates of change (+ and −) of speed when vehicle 5 is not towing a trailer 6, and the measured rates of change (+ and −) of speed can be compared to expected rates of change (+ and −) of speed. Detection of trailer 6 may involve, for example, measured rates of change (+ and −) of vehicle speed that are less than or greater than expected for a given request to change vehicle speed.

In general, the ACC may be configured to generate negative wheel torque commands to one or more negative wheel torque devices that correspond to expected changes in speed. Thus, a command to change speed may actuate negative wheel torque system (device(s)) whereby the negative wheel torque systems generate a negative wheel torque that is expected to result in a change of speed that is equal to the change in speed.

Active negative wheel torque system 8 of the trailer 6 may (at least initially) provide trailer speed reduction that causes the combined vehicle 5 and trailer 6 to change speed at a measured rate that is not equal to an expected rate for a given command to change speed (i.e. the negative wheel torque system 8 of trailer 6 may overcompensate for the weight of trailer 6 and provide negative wheel torque that is greater than expected). Alternatively, the active negative wheel torque system 8 of trailer 6 may undercompensate such that the combined vehicle 5 and trailer 6 change speed at a rate that is lower than expected for a given request by the system to reduce speed (e.g., a given negative wheel torque command). Thus, the ACC system (e.g., controller 40) may be configured to determine that a trailer 6 having an active negative wheel torque system 8 is being towed based, at least in part, on measured speed change behavior (data) of the combined vehicle 5 and trailer 6 that is outside of an expected range of speed change for the requests from the ACC system. Furthermore, the ACC may be configured to initially detect a possible trailer 6, and may prompt a user to confirm via input 46 that a trailer 6 with an active negative wheel torque system 8 is being towed by vehicle 5.

If the ACC determines at step 106 that the vehicle is not towing a trailer 6, the process proceeds to step 108, and utilizes the "no trailer" ACC mode, whereby the requests of the ACC system (e.g., controller 40) to increase and/or decrease speed are not modified to account for a trailer 6 having a negative wheel torque system 8.

If a trailer 6 is detected at 106, the ACC then determines at 110 if the rate of reduction in speed of the combined vehicle 5 and trailer 6 in response to activating the negative wheel torque system of vehicle 5 and/or trailer 6 at the current vehicle speed is acceptable. In general, the speed change behavior of the combined vehicle 5 and trailer 6 may depend on the vehicle speed, such that requests to change speed at an expected rate may need to be modified to account for the trailer 6 at some vehicle speeds, but not at other vehicle speeds. Similarly, the commands to reduce speed (negative wheel torque commands) may need to be modified more at some vehicle speeds than at other vehicle speeds to provide the desired rate of reduction in speed of the combined vehicle 5 and trailer 6.

Various predefined criteria may be utilized to determine if the rate of reduction in speed at a given vehicle speed is acceptable. For example, if the rate of reduction in speed varies whereby the absolute value of the jerk (third derivative of position with respect to time) exceeds a predefined value, the ACC may determine at step 110 that the rate of reduction in speed does not meet predefined criteria. Similarly, if the measured vehicle rate of reduction in speed is not sufficiently close to the desired vehicle rate of reduction in speed, the ACC may determine at step 110 that the rate of reduction in speed is not acceptable. For example, if the absolute value of the vehicle rate of reduction in speed exceeds a predefined numerical value (i.e. a tolerance range about the desired rate of reduction in speed), the system may determine that the rate of reduction in speed is not acceptable. It will be understood that the system (e.g., the ACC) may utilize a combination of predefined criteria to determine if the rate of reduction in speed (second derivative of position with respect to time) is acceptable. Furthermore, it will be understood that the rate of reduction of speed criteria may depend on additional vehicle operating parameters and factors such as the road conditions (e.g., wet or dry), the effects of a hill, etc. when determining if the rate of reduction in speed satisfies predefined criteria.

If the rate of reduction in speed in response to the negative wheel torque requests is not acceptable at step 110, the ACC system/process proceeds to step 114. At step 114 the ACC system adjusts the magnitude and/or timing of the gain of the negative wheel torque requests to the speed control system 42 and/or the gain of the trailer negative wheel torque system 8. As discussed above, the controller 40 of vehicle 5 may be operably interconnected with the active negative wheel torque system 8 of trailer 6 via a line 44 or other suitable means (e.g., wireless transmitters/receivers). Controller 40 may generate speed reduction commands (negative wheel torque commands) to both the vehicle speed control system 42 and the negative wheel torque system 8 of trailer 6. In general, the ACC system may be configured to simultaneously send speed reduction (negative wheel torque) commands to the vehicle speed control system 42 and to the negative wheel torque system 8 of trailer 6. As discussed in more detail below in connection with FIGS. 8 and 9, the speed reduction (negative wheel torque) commands may comprise an initial gradual increase in the negative wheel torque command (i.e. a "ramp") prior to the full negative wheel torque (speed reduction) command. Also, the negative wheel torque commands may be sent to the vehicle speed control system 42 and to the active negative wheel torque system 8 at the same time. Alternatively, if required to provide an acceptable rate of reduction in speed, the command to the speed control system 42 and to the trailer negative wheel torque system 8 may be delayed or advanced in time relative to the other of the two negative wheel torque (speed reduction) commands.

As discussed above in connection with FIG. 1, vehicle 5 may have a user input 46 that may include a gain input that controls the magnitude of the negative wheel torque signal from controller 40 to active negative wheel torque system 8 of trailer 6. Similarly, the ACC (e.g., controller 40) may utilize a gain to adjust the negative wheel torque commands to the vehicle speed control system 42. In general, the input feature 46 may comprise a touch screen, buttons, and/or a knob on the interior of vehicle 5. Controller 40 may also utilize a gain feature to adjust the gain of negative wheel torque commands to the negative wheel torque system 8 of trailer 6, whereby the gain of the negative wheel torque commands to the negative wheel torque system 8 of trailer 6 can be adjusted by the controller 40. Thus, controller 40 may utilize a gain to modify predefined negative wheel torque requests if the predefined negative wheel torque requests do not result in the expected rate of change in speed.

After the gain is adjusted at step 114, the ACC may be configured to store an adjusted gain at step 116. The adjusted gain may be associated with a vehicle speed, a specific trailer 6, and/or other operating conditions. At step 118, the ACC uses the adjusted gain based on the current (measured) trailer and operating conditions. For example, if the ACC system determines at step 118 that the vehicle 5 is still towing the same trailer 6 that was being towed at step 116, the system may be configured to utilize the adjusted gain if the same (or similar) speed, trailer, and operating conditions are present as determined at step 116. The ACC may compare the present (measured) rates of increase in speed and/or rates of reduction in speeds (responses) resulting from speed increase and speed reduction (negative wheel torque) requests to prior responses to determine if the trailer 6 was towed previously.

At step 120, the ACC determines if the rate of reduction in speed is acceptable when using the modified gain. If the rate of reduction in speed is not acceptable, the ACC returns to step 114 and again adjusts the gain of the signal to the vehicle and/or trailer negative wheel torque system. However, if the rate of reduction in speed is acceptable at step 120, the system continues to use the adjusted gain that was stored at step 116 without further adjustment, provided the system continues to determine at step 120 that the rate of reduction in speed is acceptable (i.e. the ACC may continuously monitor the measured rate of reduction in speed (step 120) after using adjusted gain (step 122)). It will be understood that the ACC/system may implement steps 114-120 numerous times during operation of vehicle 5 until the rate of reduction in speed is acceptable according to predefined criteria at step 120, whereby the ACC/system then uses the adjusted gain at step 122 without further adjustment. In general, the adjustments at step 114 may be relatively small, whereby the ACC/system repeats steps 114-120 numerous times until an acceptable rate of reduction in speed is reached at step 120.

The adjusted gain used at step 122 may correspond to a specific set of operating parameters or conditions that are stored and associated with a specific adjusted gain, and the ACC/system may implement steps 114-120 when different operating parameters are encountered if the measured rate of reduction in speed is not acceptable under alternative operating conditions. Thus, the ACC may continue to learn and recognize the effects of the trailer 6 and the active negative wheel torque system 8 when new operating conditions/parameters are encountered, and the ACC may also store multiple adjusted gains that are associated with specific combinations of operating conditions/parameters. Once the ACC determines an adjusted gain that provides acceptable rate of reduction in speed for a specific set (combination) of operating conditions for a specific trailer 6 with active negative wheel torque system 8, the ACC may then utilize the adjusted gain when the same combination of operation conditions is encountered when towing the same trailer 6. The ACC may continue to monitor the rate of reduction in speed of the combined vehicle 5 and trailer 6 (e.g., by repeating step 120) and further adjust the gain of a negative wheel torque (speed reduction) signal to negative wheel torque system of vehicle 5, and/or the gain of signals to the active negative torque system 8 of trailer 6. It will be understood, however that the ACC does not adjust the gain of the trailer negative wheel torque system 8 if a trailer negative wheel torque system is not operably connected to vehicle 5 (e.g., input feature 46 does not include a trailer gain adjustment for the negative wheel torque system of trailer 6).

The ACC may be configured to utilize stored adjusted gains each time a specific trailer 6 is used with vehicle 5. For example, the ACC system (e.g., controller 40) may be configured to prompt a user to input a trailer configuration if the trailer 6 was previously towed by vehicle 5, and the ACC may utilize stored adjusted gains for the specific trailer 6 and negative wheel torque systems being towed.

As discussed above, the ACC may be configured to determine if the vehicle 5 is towing a trailer 6 at step 106 (FIG. 7). The ACC may determine that a trailer is connected utilizing various criteria. For example, if vehicle 5 includes a trailer electrical connection that connects the vehicle lights to the trailer lights, the system may be configured to recognize that a trailer has been connected to the trailer light connector of the vehicle 5. The system may also be configured to determine if there is an electrical current draw or voltage draw due to trailer negative wheel torque system 8 (e.g., a change in electrical current and/or voltage of electrical line 44 due to actuation of trailer lights and/or activation of the trailer negative wheel torque system 8).

The ACC may also be configured to utilize powertrain mass estimation to determine the estimated loading and to determine if a trailer is present. For example, the vehicle 5 may utilize differences between expected rates of increase in speed and/or rates of reduction in speed in response to requests to increase or decrease speed, respectively. The ACC may utilize a known relationship between vehicle torque and rate of reduction in speed to determine if the torque resulting from a request does not result in the expected rate of reduction in speed. For example, if the vehicle 5 does not reduce speed at an expected rate, the ACC/system may be configured to determine/estimate the total mass of the vehicle 5 and trailer 6 based on the measured rate of reduction in speed for a known wheel torque (negative wheel torque) resulting from a request to reduce speed. If the estimated mass exceeds a predefined magnitude in excess of the vehicle mass, the ACC/system may be configured to determine that a trailer 6 is connected to vehicle 5. This determination may comprise a preliminary determination that a trailer 6 is attached, and the ACC may be configured to prompt a user to confirm (e.g., via input feature 46) that a trailer 6 is attached, and may further prompt a user to input information concerning the trailer 6.

The ACC may also be configured to provide an input (e.g., via input feature 46) whereby a user can indicate that a trailer 6 is present even if the ACC does not, at least initially, determine that a trailer 6 is present. Also, a vehicle 5 may include exterior cameras and/or radar as discussed above, and inputs from the cameras and/or radar may be utilized by the ACC/system to determine that a trailer 6 is behind vehicle 5 and connected to the vehicle 5.

The vehicle 5 may be configured to reset/restart the process 100 (FIG. 7) utilizing various inputs/criteria if the vehicle 5 is not operated for a period of time. For example, if a load sensor/ride height sensor is available, the vehicle 5 can compare before and after the "key on/key off" event and determine if the "tongue load" is different, and the vehicle 5 can be configured to recalibrate accordingly. If the change in tongue load after a "key on/key off" event is within a calibrated threshold, the vehicle 5 may (optionally) continue to use the original settings (i.e., the settings prior to the "key on/key off" event). If the load change is above a calibrated (predefined) threshold, vehicle 5 may (optionally) change to a default value, scale the gain based on the differential in tongue load, and change the learning rate for the gain modifications. If a change in load is detected after a "key on/key off" event, the vehicle 5 may (optionally) ask a user for a confirmation, and the user can provide input regarding the expected mass change of the trailer/vehicle.

The vehicle 5 may be configured to determine the combined vehicle rate of reduction in speed of vehicle 5 and trailer 6 with an aftermarket trailer negative wheel torque system 8 while the ACC is active. For example, the ACC (controller 40) of vehicle 5 may be configured to use onboard sensors (e.g., sensors 15) to determine if the performance during reductions in speed is jerky or smooth. This may include utilizing separately mounted sensors on vehicle 5 and a sensor 15A (FIG. 1) mounted on trailer 6. If the change of speed profiles of vehicle 5 and trailer 6 are dissimilar and/or if the speed reductions of either vehicle 5 or trailer 6 is delayed relative to the other of vehicle 5 and trailer 6, the ACC system may be configured to adjust the magnitude and/or timing of the vehicle and/or trailer negative wheel torque (speed reduction) commands (see, e.g., step 114 of FIG. 7).

If the realized (measured) trailer/vehicle or combined vehicle rates of reduction in speed profiles indicate time misaligned rates of reductions in speed profiles, uneven rates of reduction in speed, or other types of behavior, the vehicle 5 may be configured to perform the following:

Use ACC and/or device information (sensor data) to determine how the negative wheel torque system 8 of trailer 6 contributes to the rate of reduction in speed at various speeds. This may involve use of a learning algorithm to determine how much negative torque the vehicle friction negative wheel torque system actually applied compared to how much should be applied for that weight (estimated mass from speed control system).

In some cases, the desired behavior for the trailer negative wheel torque system 8 may be non-linear and lag the vehicle negative wheel torque (friction) system or vice-versa.

This can be realized (implemented) by adjusting the gain of a negative wheel torque system (speed reduction) signal to the negative wheel torque system 8 of trailer 6 to ensure that the desired torque bias for the trailer 6 is being realized appropriately. This can be realized using the following method:

Estimate total combined vehicle weight of vehicle 5 and trailer 6.

Determine the driver negative wheel torque (speed reduction) request.

Determine torque bias for the system 8 of trailer 6 based on one or more factors such as vehicle speed, rates of reduction in speed, trailer weight relative to vehicle weight, torque tending to reduce speed, coefficient of friction of the road surface, etc. The torque bias may be assigned by the vehicle 5 to the system 8 of trailer 6.

When the driver performs (requests) a speed reduction event, the ACC system may utilize physics-based equations (e.g., F=ma), and compare the expected rate of reduction in speed based on the vehicle torque/desired bias level to the actual rates of reduction in speed of the vehicle 5 with trailer 6.

If the vehicle 5 (ACC) determines the rate of reduction in speed is higher than expected, the vehicle 5 can reduce the gain of a negative wheel torque (speed reduction) signal to the negative wheel torque systems of vehicle 5 and/or trailer 6 at that operating point. If the vehicle 5 determines the rate of reduction in speed is lower than desired, the vehicle 5 may increase the gain of a negative wheel torque signal to negative wheel torque system 8 of trailer 6 at that operating point.

The vehicle 5 (controller 40) may also learn different speed reduction values based on vehicle speed/desired speed reduction bias from the vehicle 5.

This may include regenerative (electric) and friction torque requests (e.g., trailer 6 could have an electric motor).

As discussed above in connection with FIG. 7, at step 114 the ACC system may be configured to adjust the ACC control, which may include adjusting the magnitude and/or timing of the gain of the vehicle and/or trailer negative wheel torque (speed reduction) signals to the negative wheel torque systems of vehicle 5 and/or trailer 6. The adjustments to the ACC control may also include dampening ACC requests to the friction-based negative wheel torque system of vehicle 5 and/or negative wheel torque system 8 of trailer 6 to smooth performance based on speed.

Figure 8:
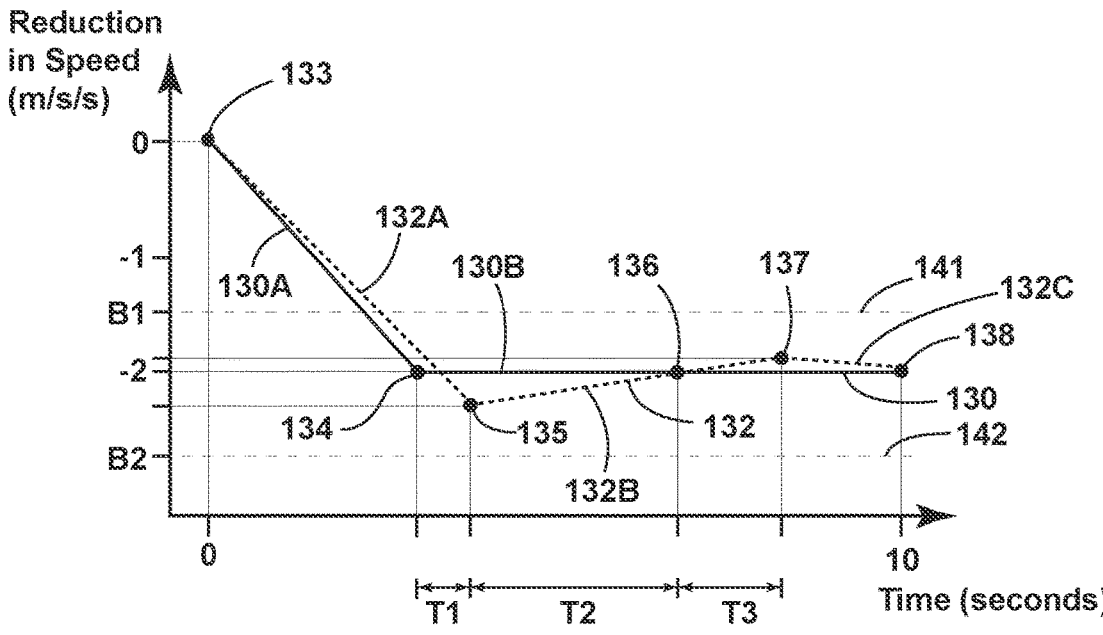
FIG. 8 is a graph showing an example of a request for reduced speed and a corresponding measured reduction in speed.

For example, with reference to FIG. 8, a speed reduction request 130 may include a first segment 130A that includes a ramp portion 130A that starts at point 133 and ends at point 134, and the request 130 may then stay at negative 2 m/s/s after two seconds. Thus, in this example, the segment 130A has a jerk rate of −1 m/s/s/s, and the segment 130B of the request 130 has a jerk rate of 0 m/s/s/s, corresponding to a request for a constant rate of change of speed. In the illustrated example, a response line 132 (measured rate of reduction in speed of vehicle 5) has a first segment that extends between points 133 and points 135, and a second segment 132B that extends upwardly from point 135, and crosses line segment 130B at point 136. In the illustrated example, the line 132 (measured rate of reduction in speed of vehicle 5 and/or trailer 6) may slope downwardly at 132C, and overlap line 130 after point 138. Thus, the actual (measured) response as shown by line 132 overshoots the request 130B at 135, and undershoots request 130B at point 137, and the request 130 and response 132 may be substantially identical after point 138. In the illustrated example, acceptable rate of reduction in speed tolerances are shown by lines 141 and 142, which correspond to points B1 and B2, respectively. Thus, in the example of FIG. 8, the measured maximum undershoot and overshoot (points 135 and 137)

are within the acceptable range defined by lines 141 and 142. It will be understood that the lines 141 and 142 are merely examples of predefined rate of reduction in speed criteria. The vehicle 5 may also be configured to provide a communication to a user indicating that the user should take over speed reduction to manually control speed reduction if the speed reduction overshoot and/or overshoot exceed a threshold value.

It will be understood that, depending on vehicle operating conditions, a speed reduction request 130 may require different negative wheel torque to achieve the requested speed reduction request 130. For example, a speed reduction request of negative 2 m/s/s may require a greater negative wheel torque command if vehicle 5 is going downhill, and a smaller negative wheel torque command may be required if vehicle 5 is going uphill. Thus, the ACC of vehicle 5 may be configured to adjust negative wheel torque commands to provide a speed reduction request 130 corresponding to the desired rate of reduction in speed.

In addition to the rate of reduction in speed acceptance criteria of lines 141 and 142, the ACC (controller 40) of vehicle 5 may also be configured to compare the requested jerk (slope of line segment 130A) to the measured jerk (slope of line segment 132A) to determine if the jerk is within a range of acceptable values. In the illustrated example, the request line segment 130A has a jerk rate (slope) of −1 m/s/s, and the response (measured) of line segment 132A has a jerk rate (slope) that is slightly less than −1 m/s/s/s, namely about −0.97 ms/s/s. If a predefined maximum difference in jerk between request 130A and response 132A is 0.05 m/s/s/s, in this example the measured jerk would be within the predefined criteria. It will be understood that this is merely an example, and the magnitude of the tolerances for rate of reduction in speed and jerk may be significantly different than the examples just described.

Referring again to FIG. 8, the ACC of vehicle 5 (controller 40) may also be configured to evaluate potential time lags or other variations in the measured rate of reduction in speed (line 132) relative to the requested rate of reduction in speed (line 130). For example, in FIG. 8 the request 130 is constant after point 134, whereas the measured response 132 reaches a minimum at point 135, resulting in a lag time of "T1." The measured response 132 then crosses the request line 130B at point 136, and peaks at point 137, followed by a decline until the request 130 and response 132 overlap after point 138. The ACC of vehicle 5 (controller 40) may be configured to utilize one or more of the lag times T1-T4 to determine if the measured vehicle response 132 is within acceptable predefined ranges.

Thus, differences between requested and measured rate of reduction in speed, jerk, and lag times may be utilized singly or in combination to determine if the actual (measured) rates of reduction in speed satisfies predefined criteria at, for example steps 110 and/or 120 (FIG. 7). It will be understood that the lines 130 and 132 of FIG. 8 are examples, and do not necessarily represent actual requests or actual measured vehicle responses, but rather illustrate examples of differences between a request and a measured rate of reduction in speed that can be utilized by the ACC of vehicle 5 (controller 40) to determine if the reductions in speed of the combined vehicle 5 and trailer 6 fall within predefined acceptable limits (i.e. satisfy predefined criteria). Also, differences between the request 130 and measured response 132 may also be utilized by the vehicle 5 to determine if a trailer 6 is being towed by the vehicle 5.

Figure 9:
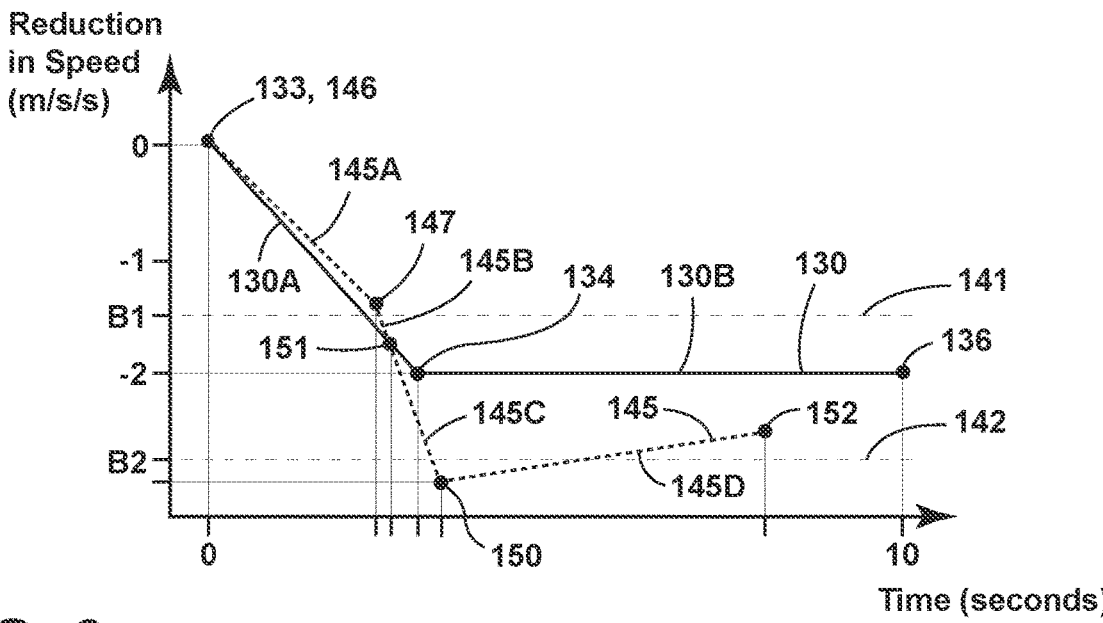
FIG. 9 is a graph showing an example of a request for reduced speed and a corresponding measured of reduction in speed.

FIG. 9 is a graph showing a measured rate of reduction in speed (line 145) that results from a request 130 to reduce speed. The request line 130 of FIG. 9 is the same as the request line 130 of FIG. 8. However, in the example of FIG. 9 the gain has been increased relative to FIG. 8, such that the negative wheel torque signal and resulting torque applied by the vehicle speed control system 42 and/or trailer negative wheel torque system 8 is greater in FIG. 9 than in FIG. 8. In the example of FIG. 9, the measured rate of reduction in speed at line segment 145 initially has a slope (jerk) that is less than the slope of request 130A. However, the measured jerk of line segment 145B is greater than line segment 130A. Also, in this example, the response line segment 145B crosses request line 130A at point 151, and the response (measured) line segment 145B crosses the horizontal axis of line segment 130B before the request line segment 130A. Furthermore, the measured response 145B extends below the horizontal request line segment 130B until it reaches a point 150 that is below the "acceptable" lower line 142. The measured response (line segment 145D) then increases until it reaches point 152.

Thus, in the example of FIG. 9, the measured rate of reduction in speed of the vehicle 5 and/or trailer 6 is outside of the predefined acceptance criteria of lines 141 and 142. Also, the slope (jerk) of line segment 145 is greater than the jerk of line segment 130A, and the response line 145 may remain below request line 130 at point 152. The ACC (e.g., controller 40) may (optionally) be configured to determine that a measured jerk exceeding a request jerk during the request ramp period (i.e. the time between points 133 and 134) constitutes an unacceptable response (e.g., at steps 110 and/or 120 of FIG. 7), and the ACC may be configured to adjust the magnitude and/or timing of the speed reduction request 130 if necessary. For example, the slope of the request line segment 130A may be decreased to thereby decrease the slope (jerk) of the response line segment 145B. Also, the magnitude of the gain may be reduced whereby the measured response (line 145) remains within the predefined acceptable limits represented by lines 141 and 142 as shown in FIG. 8.

In general, the ACC of vehicle 5 (e.g., controller 40) may be configured to utilize numerous variations with regards to adjustments to the magnitude and timing of the gain to the negative wheel torque systems of vehicle 5 and/or trailer 6 to determine the effects of the changes in speed reduction requests with regards to the measured rate of reduction in speed, and the controller may be configured to learn the relationships (correlations) between the requests (inputs) and the responses (outputs) to thereby develop a model of an unknown (aftermarket) trailer 6 having an active negative wheel torque system, whereby the ACC can determine the necessary inputs (speed reduction requests) to provide a desired rate of reduction in speed. It will be understood that numerous operating parameters such as vehicle speed, incline of a road, wet or dry road conditions, ambient temperature, etc. may be utilized during the learning process, such that the controller (ACC) is able to predict the combined response of vehicle 5 and trailer 6 utilizing numerous measured variables (operating parameters or conditions).

Also, it will be understood that the vehicle 5 may be configured to utilize a towing mode when the ACC is activated and the ACC detects a trailer 6. For example, if the vehicle 5 is towing a trailer 6, the negative wheel torque requests (speed reduction targets) may be reduced, and a target following distance relative to another vehicle may be increased. Thus, the towing mode may utilize negative wheel torque (speed reduction) requests that are specific to towing, and these requests may be adjusted by changing gain to provide desired rate of reduction in speed as may be required when towing.

Referring again to FIG. 1, the vehicle 5 may be operably connected to the active negative wheel torque system 8 of trailer 6 by one or more conductive lines 44. In some cases, the vehicle 5 may be configured to determine the voltage and/or current in the negative wheel torque system 8 of trailer 6 via conductive lines 44. In this case, the vehicle 5 may be configured to reduce the gain of active negative wheel torque system 8 of trailer 6 if, for example, the measured jerk exceeds a predefined acceptance criteria. For example, if the gain feature 46 (FIG. 1) comprises a gain controller that allows a user to adjust the gain (e.g., from 0 to 10) of negative wheel torque signals to the negative wheel torque system 8 of trailer 6, this gain may be applied by the trailer 6 to the active negative wheel torque system 8 of trailer 6. However, the vehicle 5 may be configured to alter the gain set by input feature 46 if the vehicle 5 determines that the gain that was input by an operator is likely to result in operating conditions such as jerk that do not satisfy predefined criteria. Thus, the ACC may be configured to override a gain input by a user if the user-input gain is likely to cause rates of reductions in speed that do not satisfy one or more predefined criteria with regards to rates of reductions in speed.

Alternatively, vehicle 5 may be configured such that if the vehicle 5 detects that the ACC is active, and the vehicle 5 is towing a trailer 6 that is not recognized by the vehicle 5, the vehicle 5 may be configured to deactivate the ACC. For example, vehicle 5 may be pre-configured to recognize one or more trailers 6 having an active negative wheel torque system 8, whereby the vehicle 5 implements an adjusted ACC control corresponding to a known trailer 6 with a known active negative wheel torque system 8. However, if the vehicle 5 detects a trailer 6, and vehicle 5 does not recognize the trailer 6, the vehicle 5 may be configured to deactivate the ACC.

The vehicle 5 may also be configured to compare requests to reduce speed with wheel torque. In general, vehicle 5 (controller 40) may be configured such that a request to reduce speed corresponds to a known or predicted negative wheel torque. The vehicle 5 may be configured to compare the ACC requested rate of reduction in speed with the wheel torque once the driver has found a "steady state" (i.e. comfortable) setting for the gain of a speed reduction negative wheel torque signal to the negative wheel torque system 8 of trailer 6.

The ACC may optionally be configured to develop a steady state ratio. For example, on a highway, the ACC may request 2 m/s/s rate of reduction in speed, during which average wheel torque over 2 seconds is 4,000 Nm (negative, because slowing down), and the ratio in this example is 4,000/2=2,000.

If the trailer gain is the same, but this multiplier (ratio) changes significantly (e.g., a predefined calibratable threshold), this may indicate that the trailer gain is incorrect.

For example, in the city, if the ACC requests a 2 m/s/s rate of reduction in speed, and average wheel torque over 2 seconds is 10,000 Nm, the ratio is 10,000/2=5,000. In this example, this ratio is much greater than the steady state (i.e. comfortable) ratio of 2,000. The ACC may interpret the difference in ratio as an indication that the trailer gain (gain of negative wheel torque signal to negative wheel torque system 8) should be adjusted.

In this example, the ACC may be configured to lower the trailer gain slowly until the ratio matches the steady state ratio (2,000) again (within a predefined threshold).

Such operations described herein should always be implemented and/or performed in accordance with the owner's manual and safety guidelines.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A motor vehicle comprising:
a vehicle control system;
a speed control system that is configured to increase a speed of the vehicle and to provide negative vehicle wheel torque to reduce the speed of the vehicle when the speed control system receives a speed reduction command;
the vehicle control system including an adaptive cruise control that is configured to determine that the vehicle is towing a trailer having an active speed reduction system whereby the trailer generates negative trailer wheel torque in addition to negative vehicle wheel torque, and to operate the speed control system to compensate for the negative trailer wheel torque and provide a desired vehicle rate of reduction in speed when the vehicle is towing a trailer having an active speed reduction system, wherein the adaptive cruise control is configured to generate speed reduction commands to the speed control system of the vehicle and/or to the active speed reduction system of the trailer to maintain: 1) a vehicle speed and/or 2) a target following distance between the vehicle and a target vehicle in front of the vehicle, wherein the speed reduction commands are associated with expected rates of reductions in speed of the vehicle;
and wherein the adaptive cruise control is configured to determine an estimated combined mass of the vehicle and trailer;
and wherein the adaptive cruise control is configured to determine the rate of reduction in speed of the vehicle due to the active trailer speed reduction system based, at least in part, on 1) the estimated combined mass of the vehicle and trailer and, 2) measured rate of reduction in speed of the vehicle in response to a speed reduction command;
and wherein the adaptive cruise control is configured to continuously monitor and compare the measured rate of reduction in speed of the vehicle to an expected rate of reduction in speed of the vehicle corresponding to the speed reduction command while the vehicle is towing a trailer having an active speed reduction system, and to continuously adjust speed reduction commands to the vehicle speed control system and/or speed reduction commands to the active speed reduction system of the trailer while the vehicle is towing a trailer having an active speed reduction system if a vehicle rate of reduction in speed does not satisfy predefined criteria, whereby the vehicle control system determines the effects of the negative trailer wheel torque and compensates for negative trailer wheel torque.

2. The motor vehicle of claim 1, wherein:
the predefined criteria further comprises a maximum acceptable jerk, wherein jerk is the third derivative of position with respect to time.

3. The motor vehicle of claim 2, wherein:

the maximum acceptable jerk comprises a predefined numerical value.

4. The motor vehicle of claim 1, wherein:

the adaptive cruise control is configured to utilize a towing mode if the adaptive cruise control determines that a trailer is connected to the vehicle;

and wherein, when in the towing mode, the adaptive cruise control is configured to determine a desired rate of reduction in speed and generate an initial speed reduction command to the speed control system based, at least in part, on the desired rate of reduction in speed, and wherein the adaptive cruise control is configured to determine a difference between a measured rate of reduction in speed resulting from the speed reduction command and the desired rate of reduction in speed while towing a trailer, and to adjust the initial speed reduction command while towing a trailer to provide an adjusted speed reduction command that reduces differences between the measured rate of reduction in speed and the desired rate of reduction in speed.

5. The motor vehicle of claim 4, wherein:

the adaptive cruise control is configured to store an adjusted speed reduction command and associate the adjusted speed reduction command with a specific trailer configuration.

6. The motor vehicle of claim 5, wherein:

the adaptive cruise control is configured to determine and store a plurality of adjusted speed reduction commands, wherein each adjusted speed reduction command is associated with a specific trailer configuration and vehicle operating condition, and wherein the adaptive cruise control is configured to determine if a trailer being towed has a specific trailer configuration of a stored adjusted speed reduction command, and utilize a selected adjusted speed reduction command and provide an adjusted speed reduction command to the active speed reduction system of the trailer being towed by the motor vehicle.

7. The motor vehicle of claim 6, wherein:

the vehicle operating conditions comprise vehicle speed.

8. The motor vehicle of claim 4, wherein:

the adaptive cruise control is configured to repeatedly determine, while towing a trailer having an active speed reduction system, a difference between the measured rate of reduction in speed resulting from the speed reduction command and the desired rate of reduction in speed, where in the difference is due to negative trailer wheel torque of the active speed reduction system of the trailer, and to adjust the initial speed reduction command to provide an adjusted speed reduction command that further reduces differences between the measured rate of reduction in speed and the desired rate of reduction in speed, whereby the adaptive cruise control compensates for negative trailer wheel torque of the active speed reduction system of the trailer.

9. The motor vehicle of claim 1, wherein:

the controller is configured to reduce a gain of a speed reduction command to the speed control system of the vehicle and/or a speed reduction command to the active speed reduction system of the trailer if the measured rate of reduction in speed associated with the speed reduction command is greater than the expected rate of reduction in speed associated with the speed reduction command.

10. The motor vehicle of claim 9, wherein:

the controller is configured to associate a plurality of reduced gains with specific vehicle operating parameters and utilize a selected one of the reduced gains when the specific vehicle operating parameters are present.

11. The motor vehicle of claim 10, wherein:

the specific vehicle operating parameters comprise vehicle speed.

12. A method of controlling a motor vehicle while the motor vehicle is towing a trailer having an active speed reduction system, the method comprising:

actuating cruise control of the vehicle to control a speed control system of the vehicle;

utilizing the vehicle cruise control to provide speed reduction commands to 1) an active speed reduction system of a trailer being towed by the vehicle, and 2) a vehicle speed control system, wherein the speed reduction command is provided while the vehicle is towing a trailer having an active speed reduction system whereby the trailer generates negative trailer wheel torque in addition to a negative vehicle wheel torque of the vehicle, and wherein the speed reduction command corresponds to an expected rate of reduction in speed that would occur if the vehicle was not towing a trailer having an active speed reduction system;

measuring rate of reduction in speed of the vehicle in response to the speed reduction commands to the active speed reduction system of the trailer being towed by the vehicle and to the vehicle speed control system;

determining a difference between measured rate of reduction in speed and the expected rate of reduction in speed corresponding to the speed reduction command; and utilizing the vehicle cruise control to provide an adjusted speed reduction command that reduces the difference between measured rate of reduction in speed and the expected rate of reduction in speed whereby the adjusted speed reduction command takes into account negative trailer wheel torque due to the active speed reduction system of the trailer.

13. The method of claim 12, including:

utilizing a control system of the vehicle to determine rate of reduction in speed due to the negative wheel torque of the active speed reduction system of a trailer that is being towed by the vehicle;

utilizing the control system of the vehicle to adjust a speed reduction command to the vehicle speed control system and a speed reduction command to the active speed reduction system of a trailer that is being towed by the vehicle to compensate for the negative trailer wheel torque.

14. The method of claim 13, including:

storing an adjusted speed reduction command and an associated vehicle operating condition; and causing the vehicle cruise control to utilize the adjusted speed reduction command when the vehicle cruise control determines that the associated vehicle operating condition is present.

15. The method of claim 14, wherein:

the associated vehicle operating condition comprises vehicle speed; and including:

storing a plurality of adjusted speed reduction commands, wherein the adjusted speed reduction commands are associated with different vehicle speeds.

16. The method of claim 12, including:

providing a trailer input gain control feature that permits a user to adjust a trailer speed reduction gain input to the vehicle cruise control to thereby adjust the rate of reduction in speed requests from the vehicle cruise control, wherein each rate of reduction in speed request corresponds to a torque of the vehicle speed control system that is used to maintain the vehicle at a first speed;

adjusting the trailer gain until an acceptable gain is found at which the vehicle cruise control provides a combined vehicle and trailer rate of reduction in speed that is acceptable to the user;

determining a target ratio corresponding to the acceptable gain, wherein the target ratio comprises a ratio of vehicle wheel torque at the first speed to a requested rate of reduction in speed at the first speed; and when the vehicle is not operating at the first speed, determine a present ratio of vehicle speed to requested rate of reduction in speed, and adjusting the trailer gain of the vehicle cruise control supplied to the active speed reduction system of the trailer to reduce a difference between the target ratio and the present ratio.

17. A motor vehicle comprising:

one or more sensors configured to provide sensor data concerning vehicle operating parameters;

a speed control system including a motor that is configured to provide a positive torque that tends to increase a vehicle speed, and a vehicle speed reduction system that is configured to provide a negative vehicle wheel torque that tends to reduce vehicle speed; and a vehicle control system including an adaptive cruise control that is configured to determine that the vehicle is towing a trailer having an active speed reduction system whereby the trailer generates negative trailer wheel torque in addition to negative vehicle wheel torque, and to generate speed reduction actuation requests to actuate the vehicle speed reduction system and an active speed reduction system of a trailer, wherein the speed reduction actuation requests are based, at least in part, on sensor data from the one or more sensors, and wherein the adaptive cruise control is configured to determine speed reduction effects of the active speed reduction system of the trailer, and to adjust the speed reduction actuation requests to the vehicle speed reduction system and to the active speed reduction system of the trailer to compensate for the negative trailer wheel torque based, at least in part, on the rate of reduction in speed effects of the active speed reduction system of the trailer being towed by the vehicle to reduce variations in rates of reductions in speed caused by the active speed reduction system of the trailer, whereby the vehicle control system determines the effects of the negative trailer wheel torque and compensates for negative trailer wheel torque.

18. The motor vehicle of claim 17, wherein:

the motor vehicle is configured to determine if a trailer is operably connected to the motor vehicle;

the adaptive cruise control is configured to generate speed reduction actuation requests corresponding to desired rates of reduction in speed; and the adaptive cruise control is configured to compare measured rates of reductions in speed resulting from speed reduction actuation requests and adjust new speed reduction actuation requests to reduce differences between the measured rates of reductions in speed and the desired rates of reduction in speed.

19. The motor vehicle of claim 17, including:

a trailer operably connected to the motor vehicle, the trailer including an active speed reduction system, and wherein the adaptive cruise control is configured such that, prior to adjustment of the speed reduction actuation requests, the adaptive cruise control causes speed reduction undershoot and/or speed reduction overshoot, wherein the speed reduction overshoot comprises a rate of reduction in speed that is greater than a desired rate of reduction in speed, and the speed reduction undershoot comprises a rate of reduction in speed that is less than a desired rate of reduction in speed;

the adjustments of the speed reduction actuation requests reduce at least one of speed reduction overshoot and speed reduction undershoot.

20. The motor vehicle of claim 17, wherein:

the adaptive cruise control is configured to provide a first trailer speed reduction gain at highway speeds, and a second trailer speed reduction gain at low speeds, wherein the first trailer speed reduction gain is greater than the second trailer speed reduction gain whereby the one or more speed reduction devices provide greater torque to slow the trailer at the first trailer gain, and wherein the highway speeds comprise a range of speeds from 55-75 mph, and the low speeds comprise a range of speeds from 5-35 mph.

* * * * *